US008265355B2

United States Patent
Zhao et al.

(10) Patent No.: US 8,265,355 B2
(45) Date of Patent: Sep. 11, 2012

(54) SYSTEM AND METHOD FOR AUTOMATED DETECTION AND SEGMENTATION OF TUMOR BOUNDARIES WITHIN MEDICAL IMAGING DATA

(75) Inventors: Luyin Zhao, White Plains, NY (US); Kwok Pun Lee, Flushing, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 929 days.

(21) Appl. No.: 11/719,214

(22) PCT Filed: Nov. 18, 2005

(86) PCT No.: PCT/IB2005/053822
§ 371 (c)(1),
(2), (4) Date: May 14, 2007

(87) PCT Pub. No.: WO2006/054267
PCT Pub. Date: May 26, 2006

(65) Prior Publication Data
US 2009/0148007 A1    Jun. 11, 2009

Related U.S. Application Data

(60) Provisional application No. 60/722,667, filed on Sep. 30, 2005, provisional application No. 60/629,754, filed on Nov. 19, 2004.

(51) Int. Cl.
*G06K 9/00* (2006.01)
(52) U.S. Cl. .................................. 382/128; 700/182
(58) Field of Classification Search ............... 382/128, 382/228
See application file for complete search history.

(56) References Cited

U.S. PATENT DOCUMENTS

| | | | |
|---|---|---|---|
| 2002/0165837 A1* | 11/2002 | Zhang et al. | 706/16 |
| 2004/0218794 A1* | 11/2004 | Kao et al. | 382/128 |
| 2005/0010445 A1 | 1/2005 | Krishnan et al. | |
| 2005/0113961 A1* | 5/2005 | Sabol et al. | 700/182 |
| 2005/0169536 A1* | 8/2005 | Accomazzi et al. | 382/228 |

OTHER PUBLICATIONS

P. Abolmaesumi et al, "Segmentation of Prostate Contours From Ultrasound Images", School of computing, Queen's University, Kingston, Ontario, Canada, IEEE, 2004, pp. III-517-III-520.

* cited by examiner

*Primary Examiner* — Hadi Akhavannik (57) ABSTRACT

A method for segmenting regions within a medical image includes evaluating a set of candidate segmentations generated from an initial segmentation. Based on distance calculations for each candidate using derivative segmentations, the best candidate is recommended to clinician if it is better than the initial segmentation. This recommender realizes a most stable segmentation that will benefit follow-up computer aided diagnosis (i.e. classifying lesion to benign/malignant).

20 Claims, 6 Drawing Sheets

SYSTEM AND METHOD FOR AUTOMATED DETECTION AND SEGMENTATION OF TUMOR BOUNDARIES WITHIN MEDICAL IMAGING DATA

This application claims priority to Provisional Application Ser. No. 60/722,667 filed Sep. 30, 2005 and Provisional Application Ser. No. 60/629,754 filed Nov. 19, 2004.

The present inventions relate to computer-aided detection systems and methods. The inventions relate more closely to a novel segmenting system and method for application in computer aided detection (CAD), computer aided diagnosis (CADx) and computer based decision-support systems (CDSS). The novel segmenting system supports automated detection and segmentation of tumor boundaries by providing suggested derivatives, as the case may be, to an initial boundary definition, to a trainer training the segmenter so that it may subsequently delineate tumor boundaries in such a way that segmented data is more "user-friendly" to machine learning techniques.

The speed and sophistication of current computer-related systems supports development of faster, and more sophisticated medical imaging systems. The consequential increase in the amounts of image data being generated, and processed, has led to numerous support applications to support examination of the data, etc. That is, various data processing software and systems have developed in order to assist physicians, clinicians, radiologists, etc., in evaluating medical images to identify and/or diagnose and evaluate the medical image data. For example, computer-aided detection (CAD) algorithms and systems have been developed to automatically identify suspicious lesions from ultrasound breast and multi-slice CT (MSCT) lung scans. Ultrasound and CT (or computed tomographic systems), are imaging modalities that are commonly used to diagnose disease though imaging in view of their ability to precisely illustrate size, shape, and location of anatomical structures, as well as abnormalities and lesions.

CAD systems automatically detect (identify) regions, such as lesions within an organ, or other medical conditions. When the image of the region is rendered and displayed, the CAD system typically marks or identifies the investigated region of interest. The marks are to draw to the attention of the user the region as marked. CAD systems may provide a classification or characterization of the lesion (region of interest). That is, a CAD system may identify a microcalcifications in a breast study, or nodules in MSCT, as potential abnormality. As a follow-up step, a CADx system may be used to further classify the abnormality into malignant or benign. CAD systems incorporate the expert knowledge of radiologists, and essentially provide a second opinion regarding detection of abnormalities in medical image data, and may render diagnostic suggestions. By supporting the early detection and classification of lesions suspicious for cancer, CAD and CADx systems allow for earlier interventions, theoretically leading to better prognosis for patients.

Most existing work for CADx and other machine learning systems follow the same methodology for supervised learning. The CADx system starts with a collection of data with known ground truth, and is "trained" on the training data to identify a set of features believed to have enough discriminant power to distinguish the ground truth, for example, malignant or benign. Challenges for those skilled in the art include extracting the features that facilitate discrimination between categories, ideally finding the most relevant features within a feature pool. CADx systems may combine heterogeneous information (e.g. image-based features with patient data), or they may find similarity metrics for example-based approaches. The skilled artisan understands that the accuracy of any computer-driven decision-support systems, or CADx systems, is limited by availability of the set of patterns already classified to implement the machine learning process (i.e., by the training set). That is, if a mushy boundary definition has been used to train a CADx-cased classifier, or the like, a mushy result will be generated by the system.

Hence the skilled artisan would find a system and process for guiding the user-interactive segmentation adjustment process, within a CADx-related process, by a recommender system in order that the most stable and optimal segmentation is realized.

It is therefore the object of this invention to provide segmenting unit for use in any computer-assisted detection or diagnostic systems and processes, where instead of allowing the trainer to merely define segmentation, the initially user-selected boundary definition is adjusted not by the trainer per se, but by the trainer choosing the "best" computer assisted variation, automatically generated by a recommender in accordance hereto.

Those skilled in the art understand that computer-assisted segmentation requires that the system be trained, particularly in distinguishing soft tissue boundaries, e.g., tumor boundaries. The present segmenter with recommender provides the ability for a computer-assisted process to operate optimally in view of its training on the "best" segmentations for use in subsequent machine learning techniques.

In one embodiment, a segmentation unit responds to a clinician's initial choice of the "best" delineation of a CAD-detected region by recommending a better boundary definition of the region than that of the initial segmentation. The inventive concept is implemented using a recommender which generates a set of derivative segmentations; each rated in view of the initial segmentation. If any of the derivative segmentations are determined by the recommender to be "better" than the initial segmentation, it is recommended to the clinician trainer. For that matter, each derivative may be further processed to determine if the machine understands there to be "better" derivatives of the first set of derivatives, and of course, if criteria are met, recommend the derivative to the clinician training the system.

In another embodiment, a process for training and implementing a segmenting process to support various CAD and CADx processes in medical imaging includes choosing an initial best segmentation of an region, then, instead of relying on the clinician/system trainer to qualify the segmentation, or adjust the initial segmentation, the recommender process operates upon the initial segmentation in an attempt to realize segmentations which are "better" with respect to use of the segmented data for later machine-learning operations. More particularly, the recommender generates a set of derivatives for the initial segmentation, and if found to be "better," recommends to the clinician trainer that he/she substitute the recommended segmentation for the initial segmentation. The machine chosen "better" segmentation may be utilized automatically, or by choice offered to the trainer.

In yet another embodiment, a computer aided detection system, including the segmenting unit with automatic recommender for boundary delineation provides for more accurate and useable segmenting for use by subsequent automated data extraction processes, and a computer aided diagnostic system, including machine learning, further includes a segmenting unit with automatic recommender for boundary delineation of this invention. The inventions also include computer-readable media upon which are downloaded sets of computer instructions for implementing the CAD and CADx

Breast cancer detection algorithms, or application programs, such as ReGrow™, and FastMarch™, are CAD-related processes that are implemented to automatically identify and segment tumors within medical imaging data. As understood by the skilled artisan, however, the boundary between a tumor and surrounding tissue is not clear-cut (in living tissue), and therefore, automatic boundary detection in computer-assisted methods fail to provide consistent, precise definition for any tumor (boundary). No definitive thresholds or algorithms have known ability to differentiate tumor pixels from boundary pixels effectively, requiring user interaction to do so. That is, known application programs typically allow a radiologists to tweak the segmentation process, by making adjustments to the CAD segmentations generated automatically, and presented to the trainer/clinician for verification.

Figure 1A:
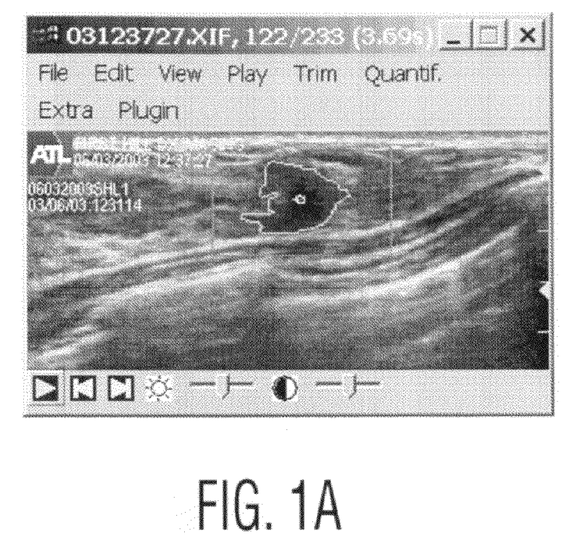
FIG. 1A and 1B depict an image within which a segmented breast tumor is highlighted.
Figure 1B:
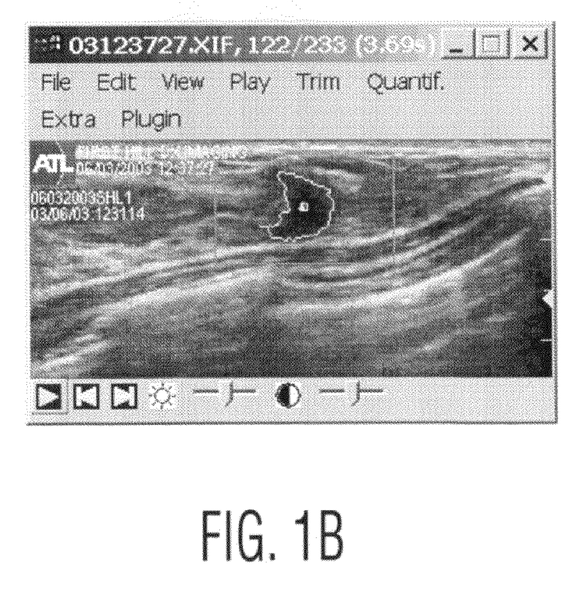

FIGS. 1A and 1B show a breast cancer (malignant region) that was segmented by the FastMarch™ algorithm (offered by HDILab software). As can be understood by a review of FIGS. 1A and 1B, adjusting particular parameters (pre-defined) by a trainer/clinician could result in the shape of a tumor, which may or may not have been automatically detected, being changed dramatically. It is the clinician/trainer who is responsible for making the adjustments in the CAD process. Because of the objective nature of radiologist input in computer training of such systems, the defined segmentation may appear "mushy" in use by subsequent processes, that is, fuzzy tumor boundaries, such that the trained system does not learn from the "best" examples how to accurately and consistently choose the best boundaries for regions investigated in newly presented analyses. More particularly, freedom of segmentation (tweaking with clinician input) impedes "automatic" tumor segmentation and "automatic" report generation.

But possibly more importantly, freedom of segmentation introduces what may akin to black magic into the training processes, for lack of a better analogy. If an initial segmentation of possibly interesting regions (i.e., tumors) in training data is arbitrarily determined by human beings, the machine learning based on such arbitrary delineation can not realize maximum performance in delineating new tumors. That is, freedom to interactively adjust the parameters ("freedom of segmentation") may actually impede "accurate" and automatic tumor segmentation, by a segmenting unit, as well as automatic report generation. These problems are due to an inherent ambiguity that the freedom to adjust, based on a clinician's judgment, might impose on the system using such segmenting unit. Chance or error arises where human beings arbitrarily determine the segmentation of the training tumors. That is, as with any machine learning process, training based on erroneously or imperfectly segmented regions for classification may result in diminished performance when used on "next-generation" data, i.e., on a non-training set. The present inventions provide a solution to limitations of conventional segmentation techniques, and an improved classifier with an improved segmentation method and sub-system.

Figure 2:
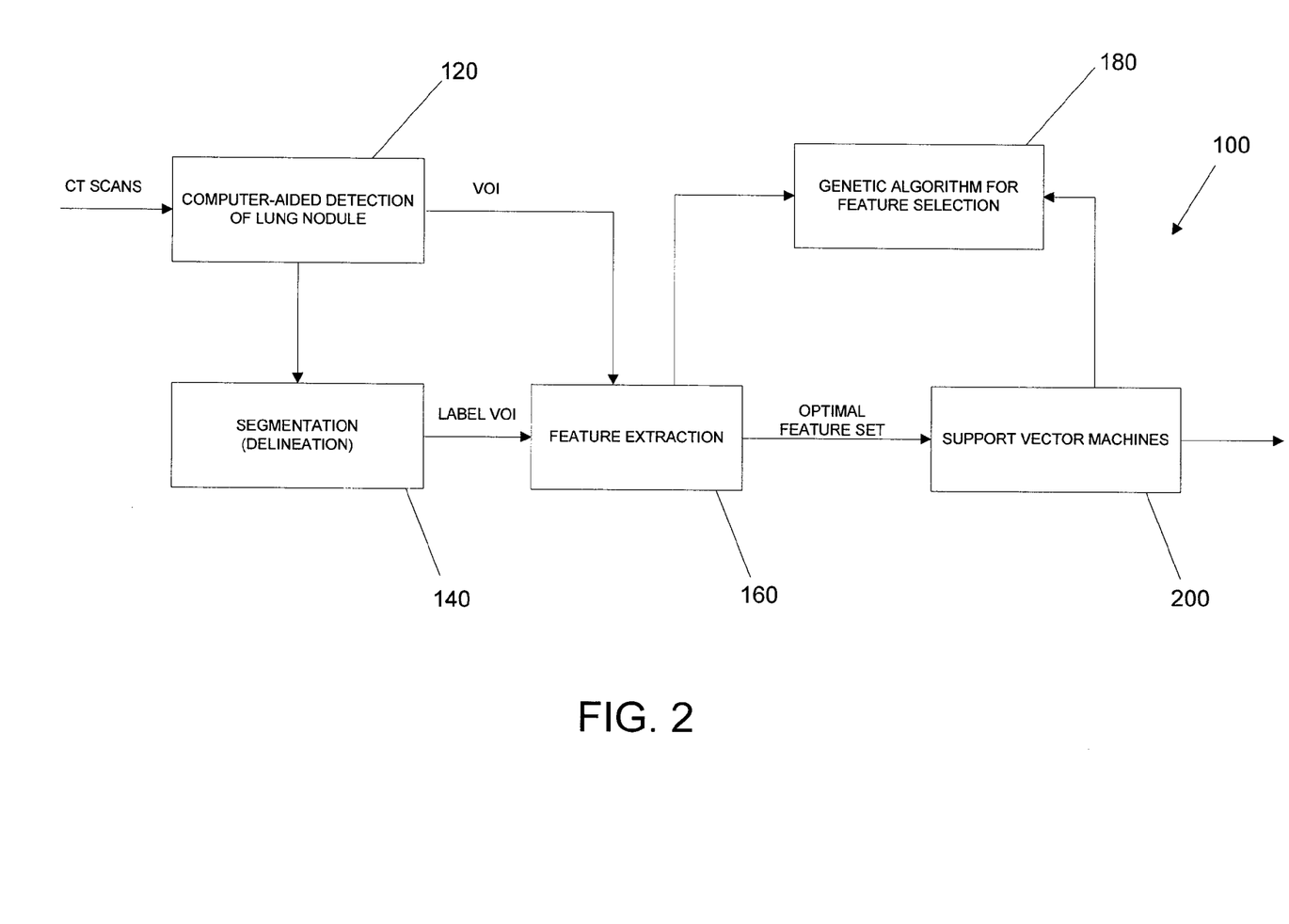
FIG. 2 is a system level diagram of a CAD system that includes an inventive segmenting unit of this invention.

An inventive segmenting system with recommender may be generalized by explanation of the operation of a false positive reductions system 100 of FIG. 2, described and explained in commonly-owned, co-pending application no. PHUS040505, incorporated by reference herein. A CAD system 120 identifies regions of interest, and insertion of segmentation sub-system 140, including the recommender sub-system (not shown explicitly in the figure), provides a unique way to guide the boundary adjustment process and realize more clinically objective segmentation. That is, segmenting unit 140 with recommender generates and outputs the segmented data to a feature extraction unit 160. The features are optimized in a GA 180, and the ultimate classification made by an SVM 200.

Figure 3A:
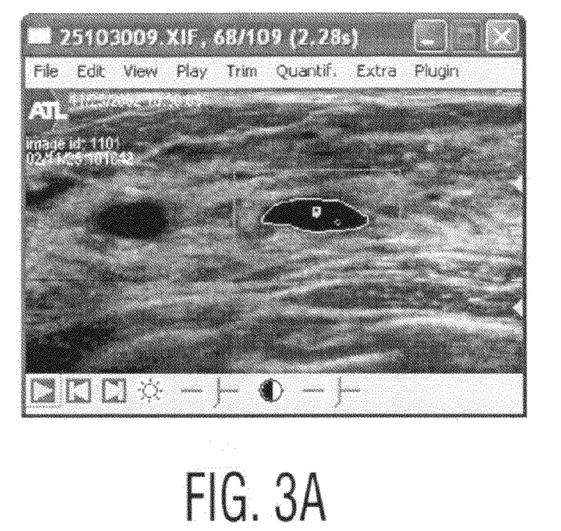
FIGS. 3A, 3B, 3C and 3D are examples of various segmentations, and suggested segmentations of a region segmented as a potential nodule.
Figure 3B:
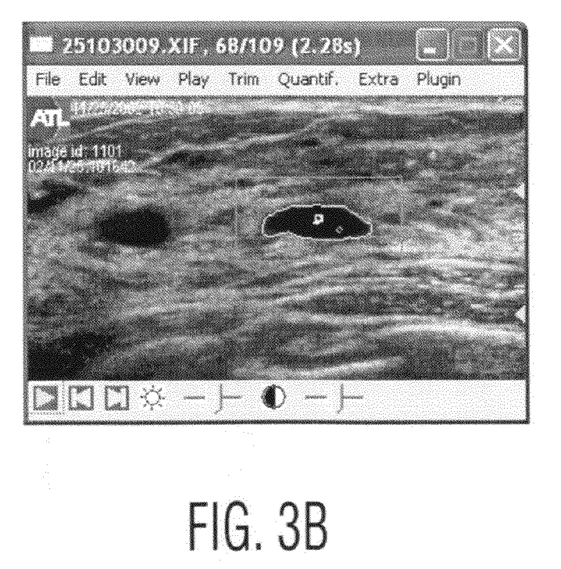
Figure 3C:
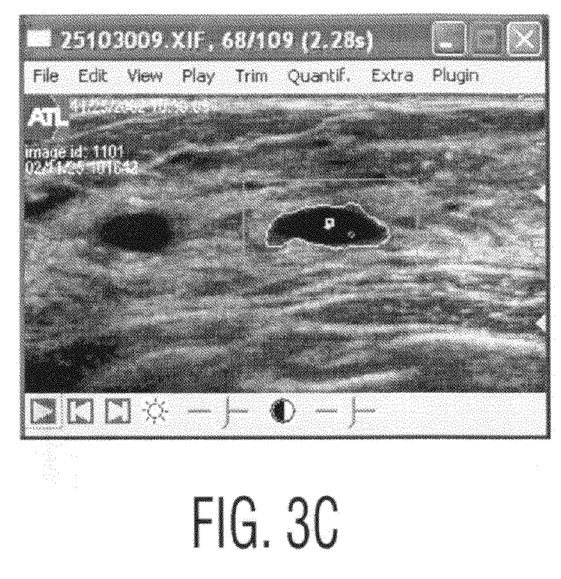
Figure 3D:
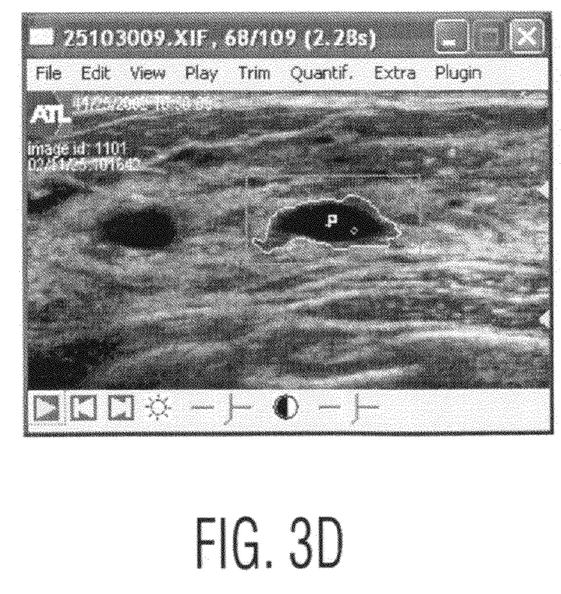

The clinician/radiologist/trainer first designates an initial segmentation generated by the segmenter with recommender 140. The recommender varies the segmenting in order to find a "better" segmentation. If the recommender determines that the "better" segmentation is indeed better than the initial segmentation, it automatically suggests a derivative delineation for the region. For example, the inventive segmenter w/recommender makes an assumption that, for a better segmentation, such as that segmentation shown in FIG. 3A, adjusting parameters causes less changing of shape than a "worse" segmentation, as shown by the segmented boundaries in FIG. 3C. That is, FIG. 3A and FIG. 3C depict two segmentations for a breast tumor, where the segmentation of FIG. 3A is apparently better than the segmentation shown in FIG. 3C since its boundary leaks into the surrounding tissue. But in reality, a radiologist or clinician supporting the classifier training might be satisfied with FIG. 3C segmentation because in his/her experience, the FIG. 3C segmentation looks very good. Under such circumstances, the inventive segmenter w/recommender 140 guides the training to proceed toward the segmentation of FIG. 3A by adjusting parameters. In explanation, and as readily understood by a careful review of each of FIGS. 3A, 3B, 3C, and 3D, when one parameter (i.e., threshold) is adjusted by, for example, 10 units or steps with respect to both segmentations, the FIG. 3A segmentation becomes very similar to the FIG. 3B, and the FIG. 3C segmentation becomes very much like the FIG. 3D segmentation. It should be obvious to those of skill in the art that the segmented shape changes more in the case of the FIG. 3C segmentation than in the FIG. 3A segmentation. Based on this unique characteristic, and automatic suggestions, the CAD-based system may realize segmentations that are better or are worse for overall segmentation accuracy.

A typical CAD-based system, such as classifier 100 (FIG. 2), including inventive segmenting unit 230, requires that the radiologist or clinician define an initial segmentation to train the system. Once delineated, the segmenting unit automatically perturbs (adjusts) parameters, and "tests" to determine whether the candidate segmentations generated by the perturbations are "better" than the initial segmentation. For example, if there are five (5) parameters or features to perturb, the system automatically decreases and increases each parameter by particular amounts (e.g., −1%, −2%, 1%, 2%). By adjusting based on a unique characteristic, such as threshold value, after input from an expert to identify the particular parameter, optimal segmentation is realized, for whatever CAD processes are supported by the segmenter w/recommender. Optimal segmentation is "learned," and based thereon, the best parameters or features for identifying similar boundaries is optimized. The reader should note, though, that if 4 perturbations are allowed for each parameter (as shown above), the total number of candidate segmentations would have to be: 4×4×4×4×4=1024.

Next, the segmenter and recommender together, and with clinician input, render a decision ("suggestion") as to which ones of the 1024 candidate segmentations will be recommended to the radiologist for use in training the classifier. The inventive recommender supports the ultimate choice for segmenting, if the recommender understands that the choice is "better" for training than the original segmentation, where there are 1024 derivative segmentations. A second-round perturbation may be implemented on the original segmentation, and each of the 1024 candidate segmentations. Thus, for the original segmentation, and each candidate segmentation, there are 1024 derivative segmentations. In order to implement the perturbations, an algorithm calculates Distance as follows.

That is, the following graph is a segmented tumor and the center point is the seed point used by the CAD algorithm. The CAD calculates Distance=Sum (length of each axis), where M=Sum [Distance (Original)−Distance (each candidate)]. Because each of the 1024 candidate segmentations yields another derivative 1024 segmentations after the second-round perturbation, each of the candidate segmentation has N1=Sum [Distance(Candidate 1)−Distance(each derivative)]

N2=Sum [Distance(Candidate 2)−Distance(each derivative)],

...

N1024=Sum [Distance(Candidate 1024)−Distance (each derivative)].

Finally, 1025 numbers are sorted in ascending order by their absolute values. If M is at the top, no recommendation is made. Otherwise, the top candidates are recommended to the radiologist as possible improvement to the original segmentation. The application of the proposed features, as segmented, defines a markedly improved classification system.

Figure 4:
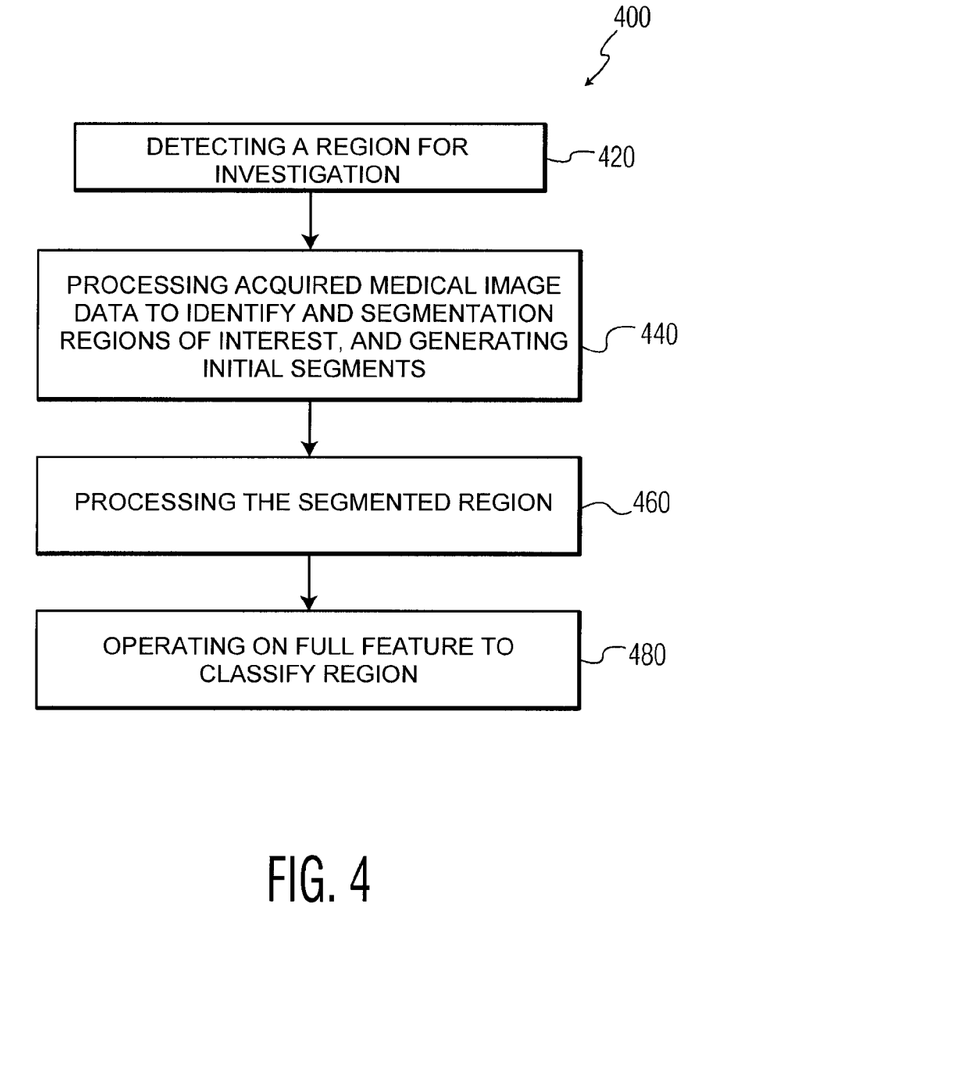
FIG. 4 is a flow diagram depicting a process, which may be implemented in accordance with the present invention.

FIG. 4 is a flow diagram depicting a process, which may be implemented in accordance with the present invention. That is, FIG. 4 is a flow diagram setting forth one embodiment of an applied process of the inventions herein. Box 400 represents the system, and Box 420 represents a step of detecting a region for investigation, and box 440 represents a step of processing the acquired medical image data to identify and segment regions of clinical or morphological interest, and generating an initial segmentation. Box 460 represents a step of further processing the segmented region using the segmenter w/recommender. Box 480 represents a step of operating upon the full feature to classify the region. The step of training includes using the segmenter w/recommender to generate perturbations in the parameters defining a segmented region's boundaries, with respect to the initial segmentation. The perturbations are based on a parameter adjustment process, and generate a plurality of candidate segmentations, and recommending candidate segmentations upon determination that the candidate is better than the initial segmentation.

Figure 5:
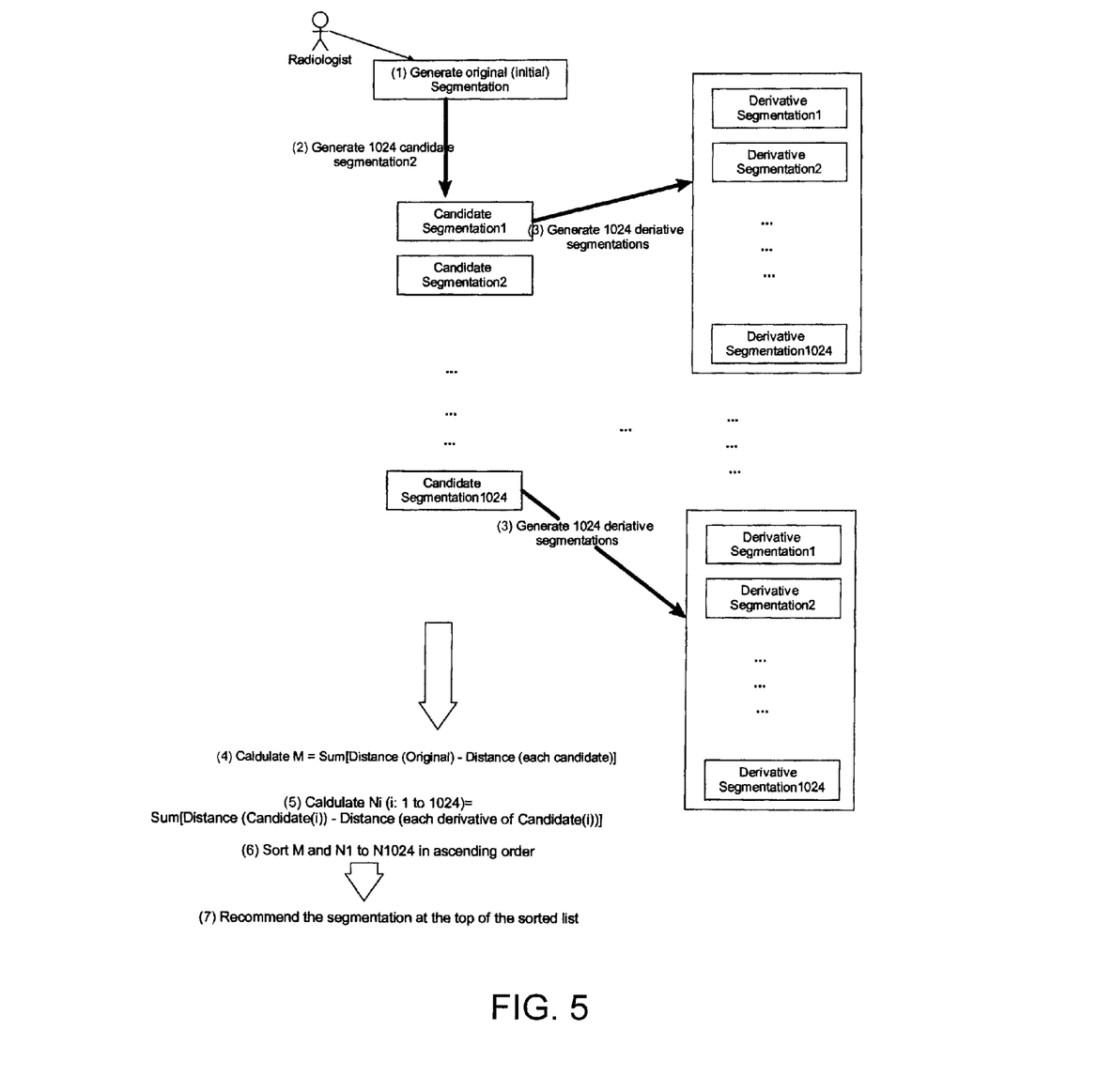
FIG. 5 is a flow diagram depicting a process for implementing a recommender process of the invention.

A more detailed understanding of the segmenter with recommender, and its operation, may be had from a review of the processing set forth in FIG. 5.

It is significant to note that software required to perform the inventive methods, or comprise the inventive classifiers and/or classification systems, may comprise an ordered listing of executable instructions for implementing logical functions. As such, the software can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiment(s), are merely possible examples of implementations that are merely set forth for a clear understanding of the principles of the invention. Furthermore, many variations and modifications may be made to the above-described embodiments of the invention without departing substantially from the spirit and principles of the invention. All such modifications and variations are intended to be taught by the present disclosure, included within the scope of the present invention, and protected by the following claims.

The invention claimed is:

1. A method for classifying regions of interest within a medical image, comprising the steps of:
    training a classifier on a set of medical image training data, which training data includes segmented regions where a clinical ground truth classifying the segmented regions is known;
    acquiring non-training medical image data for investigation;
    generating an initial segmentation for a region of interest of the medical image;
    generating a plurality of candidate segmentations based on the initial segmentation;
    comparing the initial and the plurality of candidate segmentations with each other;

selecting a best segmentation from a set of segmentations including the initial and the plurality of candidate segmentations based on the comparisons, where the selected best segmentation is used to train the classifier;
processing the segmented regions to extract a full feature set for each of the segmented regions; and
classifying the regions of interest using the full feature set;
wherein, the step of training includes using a recommender to realize a stable segmentation.

2. The method as set forth in claim 1, where the plurality of candidate segmentations are generated by generating perturbations in the parameters defining the initial segmentation, to realize a plurality of candidate segmentations, where one of the candidate segmentations is recommended if the determination is that a candidate segmentation is better than the initial segmentation and the other candidate segmentations, and where the initial segmentation is recommended if the determination is that the initial segmentation is better than the candidate segmentations.

3. The method set forth in claim 2, comprising:
generating a derivative segmentation for the initial and candidate segmentations.

4. A system, comprising:
a segmenter configured to:
segment a region of interest within a medical image to produce an initial segmentation, and
generate a plurality of co-existing candidate segmentations for the region of interest by varying or perturbing boundaries of the initial segmentation,
wherein if it is determined that one of the plurality of co-existing segmentations is better suited for post segmentation processing than the initial segmentation, then the segmenter recommends changing the initial segmentation, and
wherein if it is determined that the initial segmentation is better suited for post segmentation processing than the plurality of co-existing candidate segmentations, then a recommendation to change the initial segmentation is not made.

5. The system of claim 4, wherein the segmenter perturbs each candidate segmentation variation to determine if it is a more desirable segmentation.

6. The system of claim 4, comprising:
a CAD system; and
a false positive reduction system, in communication with the CAD system and segmenter, which includes:
a feature extractor;
a genetic algorithm in communication with the feature extractor which generates an optimal feature subset extracted by, and provided from the feature extractor; and
a support vector machine (SVM) in communication with the feature extractor for classifying each segmented region in accord with the subset of features, with a minimum of false positives.

7. The method set forth in claim 2, wherein generating perturbations in the parameters defining the initial segmentation includes at least one of increasing or decreasing a parameter by a different pre-determined amount for each of the perturbations.

8. The method set forth in claim 7, wherein the different predetermined amounts are different pre-determined percentages.

9. The method set forth in claim 7, wherein the parameters are values representing a diameter of tissue of interest.

10. The method set forth in claim 2, wherein a candidate segmentation causing less of a change in a shape of the initial segmentation is identified as better than a candidate segmentation causing more of a change in the shape of the initial segmentation.

11. The method set forth in claim 1, comprising:
determining distance values between the initial segmentation and each of the candidate segmentations;
sorting the distance values based on corresponding absolute values; and
recommending a segmentation with the lowest distance value.

12. The method set forth in claim 11, wherein the segmentation with the lowest distance value is provided to a clinician.

13. A method, comprising:
obtaining an initial segmentation;
generating a candidate segmentation set for segmentation of a region of interest in a medical image, where the candidate segmentation set comprises at least a first candidate segmentation and a second candidate segmentation; and
evaluating the initial segmentation and individual segmentations of the candidate segmentation set against one another in a non-iterative action to produce an evaluation result; and
making a determination of a better segmentation among the initial segmentation and individual candidate segmentations of the candidate segmentation set based, at least in part, on the evaluation result.

14. The method of claim 13, where if an individual candidate segmentation is determined as the better segmentation, then the individual candidate segmentation is recommended.

15. The method of claim 13, where the initial segmentation is initially recommended and where if the initial segmentation is determined as the better segmentation, then no subsequent recommendation is made.

16. The method of claim 13, further comprising:
training a classifier based, at least in part, on the determination.

17. The method of claim 16, further comprising:
using the classifier to segment a region of interest within a second medical image after training the classifier based, at least in part, on the determination.

18. The method of claim 13, further comprising:
recommending the better segmentation to a clinician when a candidate segmentation of the candidate segmentation set is the better segmentation, where the clinician can choose to replace the initial segmentation with the better segmentation or choose to keep the initial segmentation without replacing or changing the initial segmentation with the better segmentation.

19. The method of claim 13, further comprising:
determining distance values between the initial segmentation and each of the individual candidate segmentations; and
sorting the distance values based on corresponding absolute values, where the better segmentation is determined as a segmentation with the lowest distance value.

20. The method of claim 13, where individual segmentations of the candidate segmentation set are derived from the initial segmentation.

* * * * *